(12) United States Patent
Weyer et al.

(10) Patent No.: US 8,386,310 B2
(45) Date of Patent: *Feb. 26, 2013

(54) SYSTEM FOR MEASURING WEB TRAFFIC RELATED TO AN OFFLINE ADVERTISING CAMPAIGN

(75) Inventors: Lawrence A. Weyer, San Mateo, CA (US); Robert J. Page, Santa Cruz, CA (US); Bassel Ojjeh, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 845 days.

This patent is subject to a terminal disclaimer.

(21) Appl. No.: 11/726,005

(22) Filed: Mar. 20, 2007

(65) Prior Publication Data

US 2008/0235088 A1 Sep. 25, 2008

(51) Int. Cl.
*G06Q 30/00* (2012.01)
*G05B 19/418* (2006.01)
(52) U.S. Cl. ............... 705/14.41; 707/600; 707/607
(58) Field of Classification Search ............ 705/14; 707/600, 607
See application file for complete search history.

(56) References Cited

U.S. PATENT DOCUMENTS

2004/0122735 A1* 6/2004 Meshkin .................. 705/14
2007/0214234 A1* 9/2007 Robinson et al. ........ 709/217
2007/0276790 A1* 11/2007 Walsh et al. .............. 707/2

OTHER PUBLICATIONS

"Colorado Company Trying to Centralize Online Advertising", Carly Schulaka, Daily Camera, p N/A, Jul. 21, 1997.*
Office Action dated Apr. 29, 2009 of related U.S. Appl. No. 11/752,741.

* cited by examiner

*Primary Examiner* — Victoria Vanderhorst
(74) *Attorney, Agent, or Firm* — Nathan O. Greene; Brinks Hofer Gilson & Lione (57) ABSTRACT

A system is described for measuring web traffic relating to an offline advertising campaign. The system may include a processor and a memory. The memory may be operatively connected to the processor and may store an offline advertising campaign of an advertiser, a time period, a set of users and web traffic data. The processor may identify the offline advertising campaign, and the period of time the offline advertising campaign was available to a set of users. The processor may measure the web traffic related to the offline advertising campaign of the users during the time period.

20 Claims, 7 Drawing Sheets

FIG. 6

SYSTEM FOR MEASURING WEB TRAFFIC RELATED TO AN OFFLINE ADVERTISING CAMPAIGN

TECHNICAL FIELD

The present description relates generally to a system and method, generally referred to as a system, for measuring the effect of an offline advertising campaign on online behavior, and more particularly, but not exclusively, to measuring the effect of a television advertisement on the search traffic of users capable of being exposed to the television advertisement.

BACKGROUND

Online advertising may be an effective method for advertisers to reach consumers. Online advertising may give advertisers the ability to directly measure the effectiveness of their advertisements, by measuring the web traffic generated by the advertisements and/or by measuring ecommerce transactions generated by the advertisements. While online advertising campaigns may continue to grow in popularity, offline advertising campaigns, such as print advertisements, radio advertisements, and television advertisements may still be the preferred form of advertising for some advertisers. Unlike an online advertising campaign, offline advertising campaigns may suffer from an inability to directly measure the effectiveness of the campaign, particularly the effectiveness of the campaign on ecommerce. Furthermore, online advertising campaigns may run independent of offline advertising campaigns and vice-versa.

SUMMARY

A system is disclosed for measuring the effect of an offline advertising campaign on online behavior. The system may include a processor, a memory, and an interface. The memory may be operatively connected to the processor and the interface and may store a data, a site, a condition, and a page containing content. The interface may be operatively connected to the memory and the processor and may communicate the page to a user. The processor may identify the data, site, condition, and page containing content. The processor may add the data to the page if the content of the page satisfies the condition.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A system and method, generally referred to as a system, relate to measuring the effect of an offline advertising campaign on online behavior, and more particularly, but not exclusively, to measuring the effect of a television advertisement on the search traffic of users capable of viewing the television advertisement. The principles described herein may be embodied in many different forms. An advertiser's online advertisements may be more efficient when they are coordinated with offline advertising campaigns. The system may allow a revenue generator to measure the effect of an offline advertising campaign on online advertising. The system may allow a revenue generator to determine what timeframe offline advertising campaigns have the greatest effect on online advertisements. The system may allow a revenue generator to determine the effect of offline advertising on keyword searches. The system may allow a revenue generator to measure consumer interest in a brand, a set of products, or the revenue generator themselves through searches, user interaction with content, user interaction with advertisements, or generally any online user behavior that may be indicative of consumer interest.

A service provider may generate more revenue from advertisements if the advertisements are displayed to users during periods of time when users are more likely to click on the advertisement. The advertisements may also be displayed to users within a geographic region who are more likely to click on the advertisement. The system may allow a service provider to utilize offline advertising information to determine when a revenue generator's advertisement may be most likely to be clicked on. The system may also allow a service provider to determine a set of users most likely to click on the advertisement. The determinations may be made by determining the geographic region of users capable of being exposed to the offline advertising campaign and the date/time that the offline advertising campaign may have been available to the users.

Figure 1:
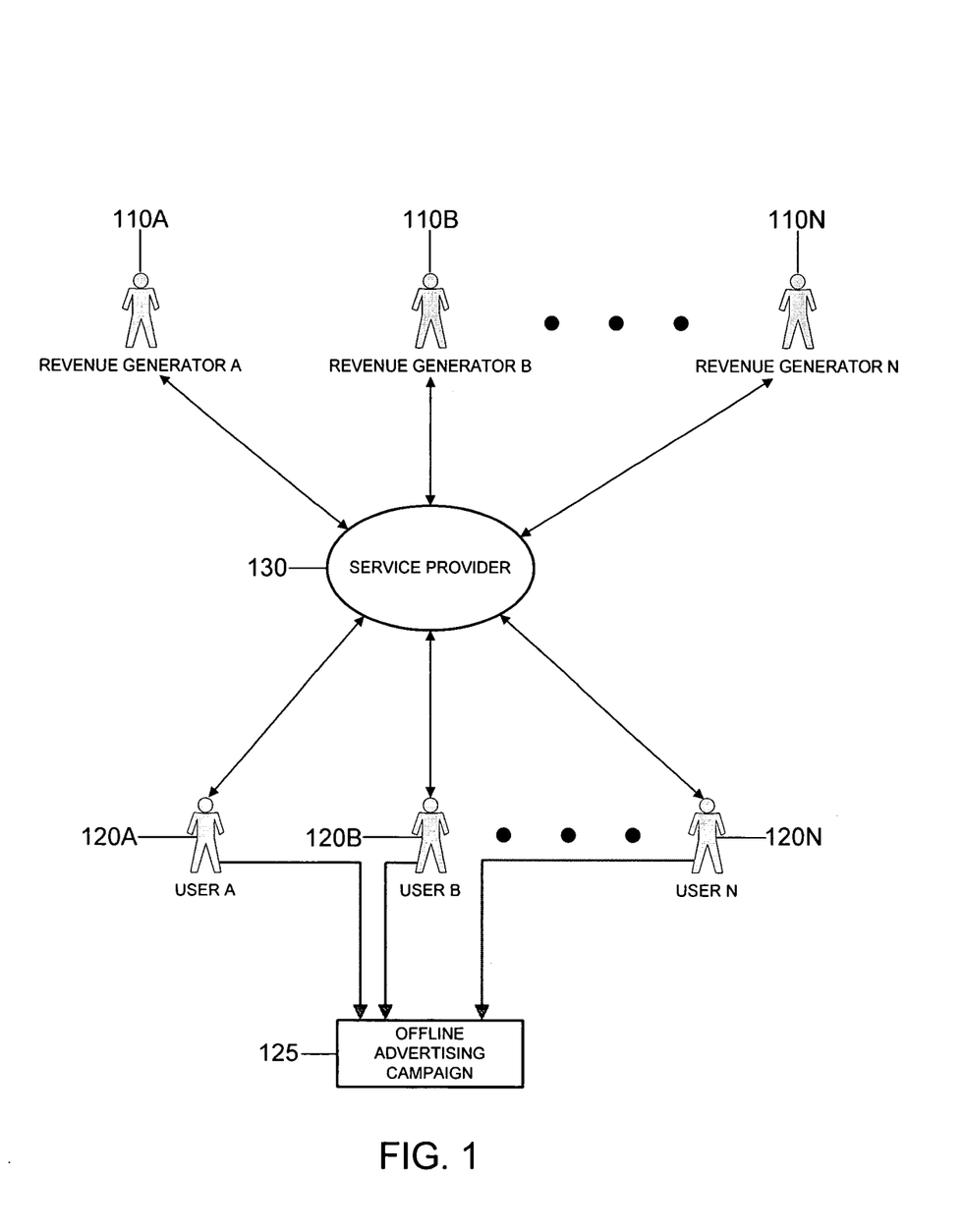
FIG. 1 is a block diagram of a general overview of a system for measuring the effect of an offline advertising campaign on online behavior.

FIG. 1 provides a general overview of a system 100 for measuring the effect of an offline advertising campaign on online behavior. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as advertisers, a service provider 130, such as a portal, one or more users 120A-N, such as web surfers or consumers, and an offline advertising campaign 125, such one or more television commercials, radio commercials or print advertisements. The revenue generators 110A-N may pay the service provider 130 to display advertisements, such as on-line advertisements on a network such as the Internet. The payments may be based on various factors, such as the number of times an advertisement may be displayed to the users 120A-N and/or the number of times one of the users 120A-N clicks through the advertisement to the revenue generator's web site. The revenue generators 110A-N may also pay the service provider 130 or other entities for displaying offline advertising campaigns, such as the offline advertising campaign 125. The users 120A-N may be consumers of goods or services who may be searching for a business such as the business of one of the revenue generators 110A-N. The users 120A-N may supply information describing themselves to the service provider 130, such as the location, gender, or age of the users 120A-N, or generally any information that may be required for the users 120A-N to utilize the services provided by the service provider 130.

In the system 100, the revenue generators 110A-N may interact with the service provider 130, such as via a web application. The revenue generators 110A-N may send information, such as billing, website and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application. The users 120A-N may also interact individually with the service provider 130, such as via a web application. The users 120A-N may interact with the service provider 130 via a web based application or a standalone application. The service provider 130 may communicate data to the revenue generators 110A-N and the users 120A-N over a network. The following examples may refer to a revenue generator A 110A as an online advertiser; however the system 100 may apply to any revenue generators 110A-N who may desire to measure the effect of their offline advertising.

In operation, one of the revenue generators 110A-N, such as revenue generator A 110A, may provide information to the service provider 130. This information may relate to the transaction taking place between the revenue generator A 110A and the service provider 130, or may relate to an account the revenue A 110A generator maintains with the service provider 130. In the case of a revenue generator A 110A who is an online advertiser, the revenue generator A 110A may provide initial information necessary to open an account with the service provider 130.

A revenue generator A 110A who is an online advertiser may maintain several accounts with the service provider 130. For each account the revenue generator A 110A may maintain several listings. A listing may include a product name, a description, one or more search keywords, an advertisement, a URL, and a bid amount. A listing may represent an association between the one or more search keywords identified by the revenue generator A 110A, and an advertisement of the revenue generator A 110A.

The product name may be the name of the product being advertised, such as "JEEP WRANGLER." The description may describe the product being advertised. For example, if GENERAL MOTORS wished to advertise a GENERAL MOTORS JEEP WRANGLER, the listing may have a description of "GENERAL MOTORS JEEP WRANGLER," "JEEP WRANGLER," or "5 PASSENGER JEEP WRANGLER."

The keywords may represent one or more search terms that the revenue generator A 110A wishes to associate their advertisement with. When a user A 120A searches for one of the listing's keywords, the advertisement of the revenue generator A 110A may be displayed on the search results page. For example, a revenue generator A 110A, such as GENERAL MOTORS, may desire to target an online advertisement for a GENERAL MOTORS JEEP WRANGLER to users 120A-N searching for the keywords "JEEP", "WRANGLER", or "JEEP WRANGLER". GENERAL MOTORS may place a bid with the service provider 130 for the search keywords "JEEP", "WRANGLER", and "JEEP WRANGLER" and may associate the online advertisement for a GENERAL MOTORS JEEP WRANGLER with the keywords. The advertisement of the revenue generator A 110A may be displayed when one of the users 120A-N searches for the keywords "JEEP", "WRANGLER", or "JEEP WRANGLER".

The advertisement may represent the data the revenue generator A 110A wishes to be displayed to a user A 120A when the users A 120A searches for one of the listing's keywords. The URL may represent the link the revenue generator A 110A wishes a user A 120A to be directed to upon clicking on the advertisement of the revenue generator A 110A, such as the home page of the revenue generator A 110A. The bid amount may represent a maximum amount the revenue generator A 110A may be willing to pay each time a user A 120A may click on the advertisement of the revenue generator A 110A or each time the advertisement of the revenue generator A 110A may be shown to a user A 120A.

There may be some instances where multiple revenue generators 110A-N may have bid on the same search keyword. The service provider 130 may serve to the users 120A-N the online advertisements that the users 120A-N may be most likely to click on. For example, the service provider 130 may include a relevancy assessment to determine the relevancy of the multiple online advertisements to the search keyword. The more relevant an advertisement may be to the keyword the more likely it may be that the user A 120A may click on the advertisement. Exemplary ways to determine relevance are described in more detail below.

When one of the users 120A-N, such as the user A 120A, interacts with the service provider 130, such as by searching for a keyword, the service provider 130 may retain data describing the interaction with the user A 120A. The saved data may include the keyword searched for, the geographic location of the user A 120A, and the date/time the user A 120A interacted with the service provider 130. The data may also generally include any data available to the service provider 130 that may assist in describing the interaction with the user A 120A, or describing the user A 120A. The service provider 130 may also store data that indicates whether an advertisement of one of the revenue generators 110A-N, such as the revenue generator A 110A was displayed to the user A 120A, and whether the user A 120A clicked on the advertisement.

The service provider 130 may already have information relating to the geographic location of the user A 120A and other information describing the user A 120A, such as gender, age, etc. This information may have been previously supplied to the service provider 130 by the user A 120A. Alternatively or in addition the service provider 130 may obtain the location of the user A 120A based on the IP address of the user A 120A. The service provider 130 may use a current date/time stamp to store the date/time when the user A 120A interacted with the service provider 130.

The service provider 130 may generate reports based on the data collected from the user interactions and communicate the reports to the revenue generators 110A-N to assist the revenue generators 110A-N in measuring the effectiveness of their online advertising. The reports may indicate the number of times the users 120A-N searched for the keywords bid on by the revenue generators 110A-N, the number of times an advertisement of the revenue generators 110A-N was displayed to the users 120A-N, the number of times the users 120A-N clicked through on the advertisements of the revenue generators 110A-N. The reports may also generally indicate any data that may assist the revenue generators 110A-N in measuring the effectiveness of their online advertising.

The reports may further include sub-reports that segment the data into more specific categories, including the time intervals when the interactions occurred, such as weeknights primetime, weekends, etc., the demographics of the users 120A-N, such as men ages 18-34, the location of the users 120A-N. The reports may also generally include any other data categorization that may assist the revenue generators 110A-N in determining the effectiveness of their online advertising.

The revenue generators 110A-N may also make an offline advertising campaign 125 available to the users 120A-N. The offline advertising campaign 125 may include one or more of a print advertisement, a radio advertisement, a television advertisement, or generally any other offline advertisement. The offline advertising campaign 125 may include offline advertisements relating to a product, a brand, a set of products, the revenue generator A 110A, or generally any other grouping of offline advertisements that may be beneficial for the revenue generators 110A-N. The nature of the offline advertising campaign 125 may result in the offline advertising campaign 125 only being available to, or targeted to, a subset of the users 120A-N, such as the users 120A-N located within a specified geographic region, the advertising region. For example, GENERAL MOTORS may only display a television advertisement for a GENERAL MOTORS JEEP WRANGLER to a regional market during a given period of time, such as the Chicago market during a television show on Wednesday nights from 7-8 PM CST. In this instance, the offline advertising campaign 125 may only be available to the users 120A-N located within the Chicago area. The advertising region in this case may be the Chicago area. The Chicago area may be defined by the city boundaries, or may be defined by a distance range extending outside of the city boundaries.

A revenue generator A 110A with an offline advertising campaign 125, may communicate to the service provider 130 information describing the offline advertising campaign 125. The information may include the one or more products being advertised and the advertising period representing the date/time the offline advertising campaign 125 may have been available to the users 120A-N. Other types of information may include the advertising region representing the geographic location of the users 120A-N capable of being exposed to the offline advertising campaign 125, the type of offline advertisements, such as print advertisements, radio advertisements or television advertisements, and any online listings that may relate to the offline advertising campaign 125. Other information may also be included such as information regarding any other data capable of describing the offline advertising campaign 125. The advertising period may include the date/time the offline advertising campaign 125 may have been first made available to the users 120A-N and/or the date/time period the offline advertising campaign 125 may have been available to the users 120A-N. The revenue generator A 110A may also communicate to the service provider 130 an advertising effect period, the period of time the revenue generator A 110A believes the online behavior of the users 120A-N may have been affected by the offline advertising campaign 125. Alternatively or in addition, the service provider 130 may be able to obtain the information describing the offline advertising campaign 125 from a third party. The third party may be unrelated to the revenue generator A 110A. In this case, the service provider 130 may automatically retrieve the data from the third party without any initiative on the part of the revenue generators 110A-N. The revenue generators 110A-N may be able to supplement, correct or otherwise modify the data supplied by the third party.

The service provider 130 may use the data supplied by the revenue generator A 110A, and/or the third party, to search the historical user interaction data to generate additional reports communicated to the revenue generator A 110A. The additional reports may demonstrate the effect of the offline advertising campaign 125 of the revenue generator A 110A on the online behavior of the users 120A-N. To generate the reports, the service provider 130 may first need to identify the relevant search keywords, the advertising effect period, and the advertising region of the offline advertising campaign 125.

To determine the search keywords that may relate to the offline advertising campaign 125, the service provider 130 may refer to the keywords bid on by the revenue generator A 110A for an online advertisement relating to the one or more products advertised in the offline advertising campaign 125. Alternatively or in addition, the service provider 130 may determine the relevant keywords by matching the descriptions of the online listings to the description of the offline advertising campaign 125, matching the product names of the online listings to the one or more product names of the offline advertising campaign 125, content matching the online advertisements with the offline advertising campaign 125. The service provider 130 may also generally determine relevant keywords by matching any common data between the online listing and the offline advertising campaign 125. Alternatively or in addition the revenue generator A 110A may specify online listings of the revenue generator A 110A that may relate to the offline advertising campaign 125. For example, in the case of GENERAL MOTORS, the offline advertising campaign 125 for the GENERAL MOTORS JEEP WRANGLER may be linked to the online listings containing search keywords bid on by GENERAL MOTORS for a GENERAL MOTORS JEEP WRANGLER online advertisement, such as "JEEP", "WRANGLER", and "JEEP WRANGLER."

Alternatively or in addition the revenue generator A 110A may specify the relevant search keywords, and/or the service provider 130 may supply set relevant search keywords for a given category of an offline advertising campaign, such as search keywords relating to car advertisements. The service provider 130 may use one or more of the name of the one or more products being advertised, the name of the revenue generator A 110A and/or any other information available to the service provider 130, through a third party or the revenue generator A 110A, which may be capable of describing the one or more products being advertised. For example, if a revenue generator A 110A, such as GENERAL MOTORS, has not bid on any keywords relating to an offline advertising campaign 125 for the JEEP WRANGLER product, and GENERAL MOTORS submits information relating to the offline advertising campaign 125 for a JEEP WRANGLER, the service provider 130 may use one or more combinations of "GENERAL MOTORS" and "JEEP WRANGLER" as the relevant search keywords.

After identifying the relevant search keywords, the service provider 130 may determine the advertising effect period, representing the period of time that the offline advertising campaign 125 may have affected the online behavior of the users 120A-N. The revenue generator A 110A may supply the service provider 130 with the period of time the revenue generator A 110A believes to be the advertising effect period, or the service provider 130 may determine an advertising effect period based on the starting date/time or the date/time period of the offline advertising campaign 125, and the types of offline advertisements. For example, if the offline advertising campaign 125 was a television advertisement available to users between 7-8 PM on Jan. 24, 2007, the advertising effect period may be 7-9 PM on Jan. 24, 2007.

The advertising effect period may be longer than the advertising period as the online behavior of the users 120A-N may be affected for a period of time beyond when the offline advertising campaign 125 may have been available to the users 120A-N. For example, if the offline advertising campaign 125 was a print advertisement in a newspaper on Jan. 24, 2007, the period of time may be the entire day on Jan. 24, 2007. Alternatively or in addition if the offline advertising campaign 125 may have been an advertisement run over several periods of time, the advertising effect period may be the collection of all the individual advertising effect periods. For example, if the advertisement was run from 7-8 PM on certain weekdays, the advertising effect period may be the collective time periods of 7-9 PM on those weekdays. Alternatively or in addition, if the offline advertising campaign 125 may have been available, or intermittently available to the users 120A-N over an extended period of time, the advertising effect period may be the entire duration of the offline advertising campaign 125, plus any additional time the online behavior of the users 120A-N may have been affected by the offline advertising campaign 125.

After identifying the relevant search keywords and the advertising effect period, the service provider 130 may determine the advertising region, representing the geographic region where users 120A-N may be capable of being exposed to the offline advertising campaign 125. This information may be supplied to the service provider 130 by the revenue generator A 110A, or by third parties. For example, if the offline advertising campaign 125 was available to the users 120A-N located in the Chicago metropolitan area, the advertising region may be the Chicago metropolitan area. The Chicago metropolitan area may be defined by the boundaries of the city of Chicago and/or a distance range extending a set distance beyond the city's boundaries.

The service provider 130 may use the relevant search keywords, the advertising effect period, and the advertising region to extract the web traffic related to the search keywords generated during the advertising effect period by users 120A-N located within the advertising region, such as the web traffic generated when the users 120A-N searched for the relevant search keywords. The total number of results returned may represent the number of times users 120A-N located within the advertising region searched for the keywords related to the offline advertising campaign 125 during the advertising effect period. The service provider 130 may use the extracted web traffic data to generate a report, such as a graph, and communicate the report to the revenue generator A 110A. The report may provide the revenue generators 110A-N with information regarding the effect of an offline advertising campaign 125 on the online behavior of the users 120A-N.

Alternatively or in addition the service provider 130 may extract other web traffic data relevant to the offline advertising campaign 125, such as data relating to the users 120A-N interaction with content, data relating to the users 120A-N interaction with advertisements, or generally any data relating to the online behavior of the users 120A-N pertaining to the offline advertising campaign 125. For example, if the revenue generator A 110A has an online advertisement relating to the offline advertising campaign 125, the service provider 130 may extract data indicating the number of times the online advertisement may have been viewed or clicked on by the users 120A-N located within the advertising region during the advertising effect period. This data may be used to generate a report, such as a graph, which may be communicated to the revenue generator A 110A.

The service provider 130 may also extract data relating to other services provided by the service provider 130 relevant to the offline advertising campaign 125. For example, if the service provider 130 offers an automobile sales portal, and GENERAL MOTORS runs an offline advertising campaign 125 for a GENERAL MOTORS JEEP WRANGLER, the service provider 130 may extract data from the automobile sales portal relevant to the offline advertising campaign 125, such as the number of times information related to the GENERAL MOTORS JEEP WRANGLER may have been viewed by the users 120A-N, whether any GENERAL MOTORS JEEP WRANGLERs may have been sold to any of the users 120A-N, whether any offers for sale may have been made by any of the users 120A-N for GENERAL MOTORS JEEP WRANGLERs, or generally any other data that may relate to the offline advertising campaign 125. In another example, if the revenue generator A 110A ran an offline advertising campaign 125 for a travel ad, and the service provider 130 offered a travel portal, the revenue generator A 110A may extract data from the travel portal relevant to the offline advertising campaign 125.

The service provider 130 may also extract control data relating to other time periods when the offline advertising campaign 125 may not have been available to the users 120A-N and/or other geographic regions where the offline advertising campaign 125 may not have been available to the users 120A-N. The control data may provide context to the advertising effect data. For example, the service provider 130 may extract control data relating to the web traffic associated with the relevant search keywords, generated within the advertising region, during a control period, a period comparative to the advertising effect period, but a period when the offline advertising campaign 125 may not have been available to the users 120A-N.

Alternatively or in addition, the service provider 130 may extract control data relating to the web traffic associated with the search keywords generated by users 120A-N located within a control region. The control region may include a region comparative to the advertising region, but a region where the offline advertising campaign 125 may not have been available during the advertising effect period. The control region may be combined with the control period to extract control data relating to the offline advertising campaign 125. Generally, the service provider 130 may extract control data in any way that may provide context to the advertising effect data.

The control period and/or control region may be supplied to the service provider by the revenue generator A 110A, or the service provider 130 may determine a control period and/or a control region through information provided by one or more third parties. The control period may be the same period of time as the advertising effect period, on a comparative day, when the offline advertising campaign 125 may not have been available to the users 120A-N within the advertising region. For example, if the advertising effect period was 7-9 PM on a Wednesday, a comparative time period may be 7-9 PM on the following day, Thursday, if the offline advertising campaign 125 was not available to the users 120A-N at that time. The control region may be a region comparative to the advertising region where the offline advertising campaign 125 may not have been available to the users 120A-N during the advertising effect period. Factors that may be considered in determining a control region for a given advertising region may be the demographic make up of the regions, the population densities of the regions or merely the population of the regions. For example, if the advertising region was New York, then, based on population, a comparative geographic region may be Chicago or Los Angeles, if the offline advertising campaign 125 was not available to the users 120A-N located within those regions.

The extracted control data may include the total number of times the users 120A-N searched for the relevant keywords during the control period and/or within the control region. The control data may be used to generate a second report, or may be used in conjunction with the advertising effect data to generate a report comparing both sets of data. The difference between the sets of data may indicate the effect of the offline advertising campaign 125 on the online behavior of the users 120A-N.

Furthermore, the service provider 130 may generate an effectiveness score indicating the effect of the offline advertising campaign 125 on the online behavior of the users 120A-N. The effectiveness score may be based an advertising effect score, the total number of times the users 120A-N located within the advertising region searched for the keywords during the advertising period, and a control score, the total number of times the users 120A-N located within the control region searched for the keywords during the control period. Alternatively or in addition the control score may be calculated based on the other aforementioned control scenarios. The effectiveness score may be calculated by subtracting the control score from the advertising effect score. The service provider 130 may also calculate an effectiveness percent, representing the percent increase or decrease of web traffic during the advertising effect period. The effectiveness percent may be calculated by dividing the advertising effect score by the control score and multiplying the result by 100.

Alternatively or in addition the service provider 130 may use the effectiveness scores and/or data relating to an offline advertising campaign 125 to assist with serving online advertisements to the users 120A-N. For example, the users 120A-N may be more likely to click on an advertisement of a revenue generator A 110A if they may have been recently exposed to an offline advertising campaign 125 relating to the online advertisement. Thus the aforementioned relevancy assessment of the service provider 130 may further include the use of effectiveness scores and/or data relating to the time and location of an offline advertising campaign 125.

For example, if a user A 120A searches, within the advertising effect period and advertising region of an offline advertising campaign 125, for a search keyword that may relate to the offline advertising campaign 125, the service provider 130 may determine that an online advertisement relating to the offline advertising campaign 125 may be more relevant than online advertisements without accompanying offline advertising campaigns. Thus, the service provider 130 may display the online advertisement relating to the offline advertising campaign 125 more prominently than the other advertisements. This may benefit both the service provider 130 and the revenue generators 110A-N by increasing the click throughs on the advertisements of the revenue generators 110A-N by the users 120A-N.

Alternatively or in addition the service provider 130 may compare the historical effectiveness scores across the advertising effect period. By comparing the historical effectiveness scores across the advertising effect period the service provider 130 may be able to determine at what point in time in the advertising effect period the offline advertising campaign 125 may have been more or less effective. The service provider 130 may use this information to determine how effective an online advertisement relating to the offline advertising campaign 125 may be depending on when the user A 120 A may have been exposed to the offline advertising campaign 125. The online advertisement may be displayed more or less prominently depending on the historical effectiveness at the point in time of the advertising effect period that the user A 120A may have been exposed to the offline advertising campaign 125.

The service provider 130 may use the historical effectiveness scores to further distinguish amongst several simultaneous offline advertising campaigns relating to the search keyword of the user A 120A. The simultaneous offline advertising campaigns may be ranked according to their historical effectiveness scores. These scores may be available or may need to be presently calculated by the service provider 130 based on historical user interaction data. Offline advertising campaigns which may have been more effective in the past may be more likely to be clicked on than those with lower effectiveness scores.

Alternatively or in addition the service provider 130 may calculate more specific historical effectiveness scores based on the demographic information of the user A 120A available to the service provider 130. For example, if the service provider 130 has information relating to the age of the user A 120A, the effectiveness score may be calculated based on a demographic age range the user A 120A falls into, such as 18-34. This may enable the service provider 130 to specifically target the user 120A-N with the online advertisement correlating to the offline advertising campaign the user A 120A may be most likely to be effected by. The service provider 130 may use any other demographic information available, such as gender, marital status, or economic background in calculating a specific historical effectiveness score.

Figure 2:
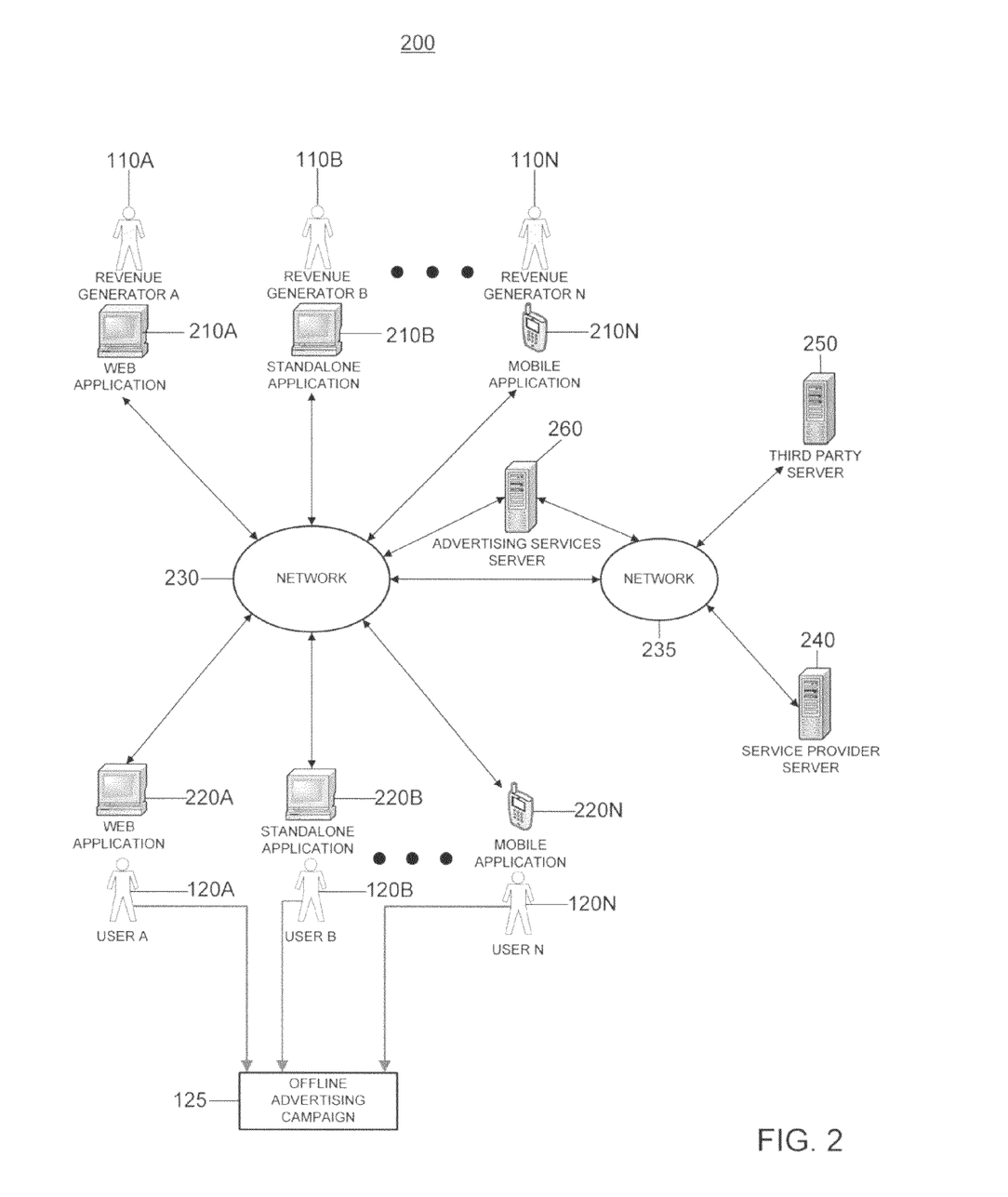
FIG. 2 is block diagram of a simplified view of a network environment implementing a system for measuring the effect of an offline advertising campaign on online behavior.

FIG. 2 provides a simplified view of a network environment implementing a system 200 for measuring the effect of an offline advertising campaign on online behavior. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 210A-N, which may be collectively or individually referred to as client applications for the revenue generators 110A-N. The system 200 may also include one or more web applications, standalone applications, mobile applications 220A-N, which may collectively be referred to as client applications for the users 120A-N, or individually as a user client application. The system 200 may also include a network 230, a network 235, the service provider server 240, a third party server 250, and an advertising services server 260. External to the system 200 may be the offline advertising campaign 125, which may be available to the users 120A-N.

Some or all of the advertisement services server 260, service provider server 240, and third-party server 250 may be in communication with each other by way of network 235 and may be the system or components described below in FIG. 7. The advertisement services server 260, third-party server 250 and service provider server 240 may each represent multiple linked computing devices. Multiple distinct third party servers, such as the third-party server 250, may be included in the system 200. The third-party server 250 may supply data indicating when offline advertising campaigns of revenue generators 110A-N may have been available to the users 120A-N of a particular region.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may communicate to the revenue generators 110A-N via the networks 230, 235, through the web applications, standalone applications or mobile applications 210A-N. The service provider server 240 may also communicate to the users 120A-N via the networks 230, 235, through the web applications, standalone applications or mobile applications 220A-N.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the revenue generator B 110B or the user B 120B. The user interface may be operatively connected to the memory, the processor, and the display and may be capable of interacting with a user A 120A or a revenue generator A 110A. The communication interface may be operatively connected to the memory, and the processor, and may be capable of communicating through the networks 230, 235 with the service provider server 240, third party server 250 and advertising services server 260. The standalone applications 210B, 220B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data source, such as a database server, a middleware server, and an advertising services server. The service provider server 240 may co-exist on one machine or may be running in a distributed configuration on one or more machines. The service provider server 240 may collectively be referred to as the server. The service provider server 240 may receive requests from the users 120A-N and the revenue generators 110A-N and may serve pages to the users 120A-N and the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. The service provider server 240 may receive requests from the users 120A-N and the revenue generators 110A-N and may serve pages to the users 120A-N and the revenue generators 110A-N based on their requests.

The advertising services server 260 may provide a platform for the inclusion of advertisements in pages, such as web pages. The advertisement services server 260 may be used for providing advertisements that may be displayed to the users 120A-N.

Figure 7:
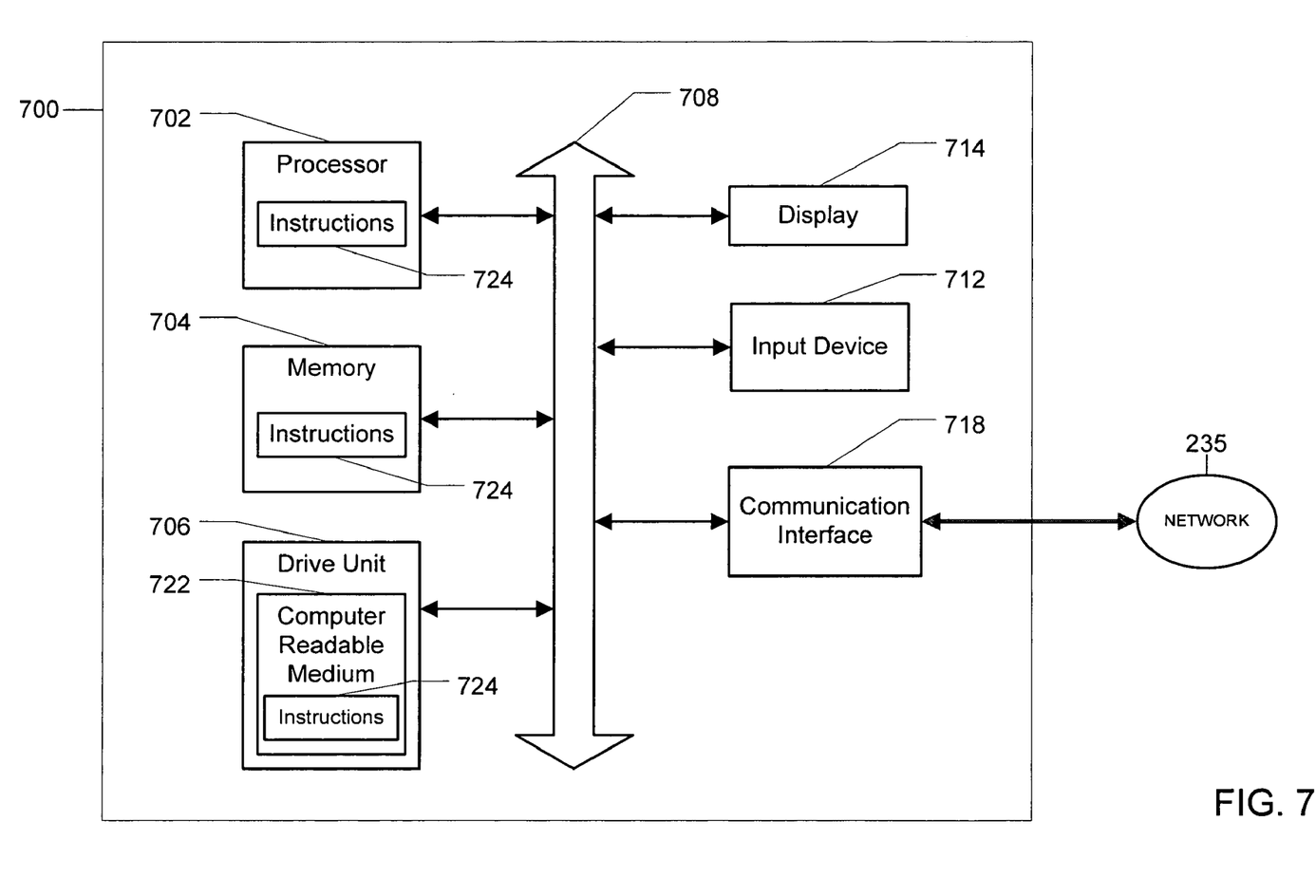
FIG. 7 is an illustration a general computer system that may be used in a system for measuring the effect of an offline advertising campaign on online behavior.

The service provider server 240, the third party server 250 and the advertising services server 260 may be one or more computing devices of various kinds, such as the computing device in FIG. 7. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages to the users 120A-N and the revenue generators 110A-N. The advertising services server may provide a platform for the inclusion of advertisements in pages, such as web pages. The advertising services server 260 may also exist independent of the service provider server 240 and the third party server 250. The advertisement services server 260 may be used for providing advertisements that may be displayed to users 120A-N on pages, such as web pages.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
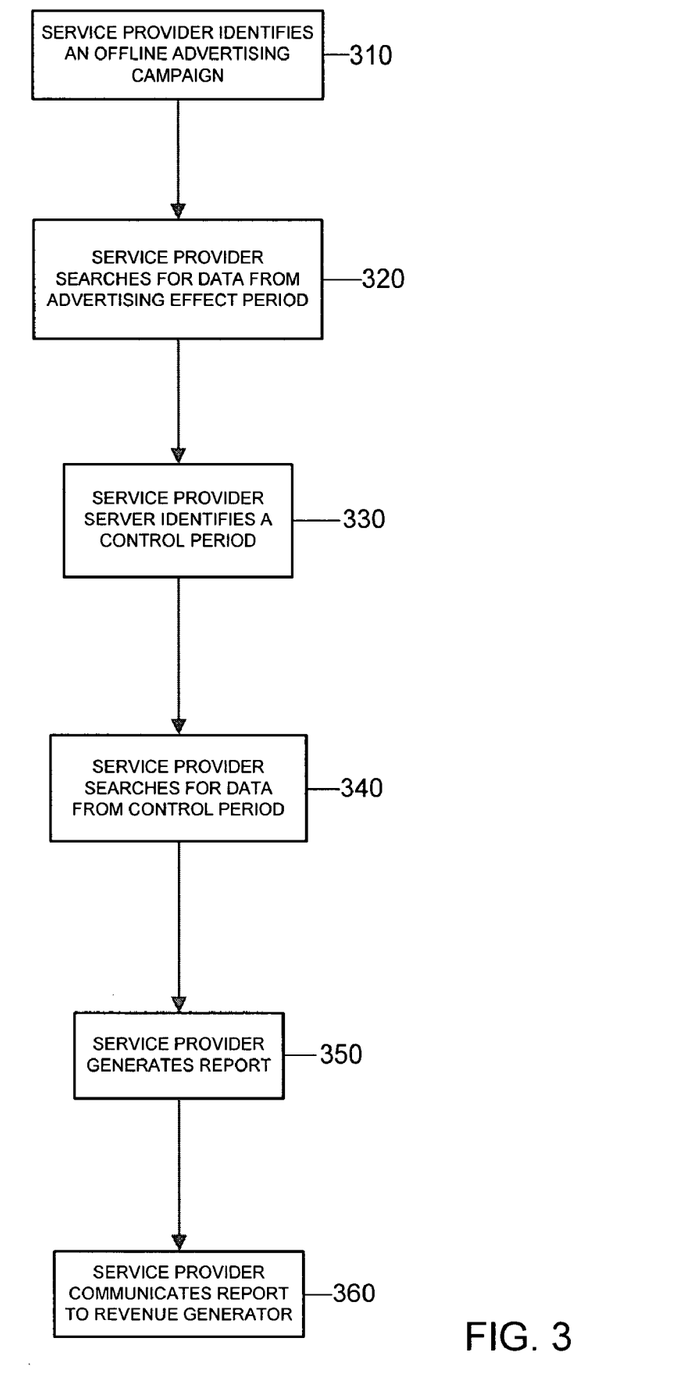
FIG. 3 is a flowchart illustrating the operations of the systems of FIG. 1 and FIG. 2, or other systems for measuring the effect of an offline advertising campaign on online behavior.

FIG. 3 is a flow chart illustrating operations of the systems of FIG. 1 and FIG. 2, or other systems for measuring the effect of an offline advertising campaign on online behavior. At block 310, the service provider server 240 may identify an offline advertising campaign 125 available to the users 120A-N located within an advertising region and during an advertising period. The service provider server 240 may identify the offline advertising campaign 125 from data communicated from the third party server 240, or from one of the revenue generators 110A-N, such as the revenue generator A 110A who may have placed the offline advertising campaign 125. The service provider server 240 may obtain information relating to the offline advertising campaign 125, such as the names of the one or more products being advertised. Other obtained information may include the advertising start date/time representing the date/time when the offline advertising campaign 125 may have been available to the users 120A-N, the advertising region representing the geographic location of the users 120A-N capable of being exposed to the offline advertising campaign 125, the type of advertisements, such as print advertisements, radio advertisements and/or television advertisements, any online listings that may relate to the offline advertising campaign 125 and/or the advertising effect period. If an advertising effect period is not defined, the service provider server 240 may determine an appropriate advertising effect period based on the advertising period and/or the advertising start date/time, and the type of advertisement.

At block 320, the service provider server 240 may search historical user interaction data to extract advertising effect data, data associated with the offline advertising campaign 125 generated during the advertising effect period and within the advertising region. The advertising effect data may include keyword searches related to the offline advertising campaign 125. The data may also include the number of click throughs or impressions of online advertisements related to the offline advertising campaign 125, web traffic of other services offered by the service provider 130 related to the offline advertising campaign 125, and any other web traffic that may relate to the offline advertising campaign 125.

At block 330, the service provider server 240 may identify a control period when the offline advertising campaign 125 may not have been available to the users 120A-N within the advertising region. The control period may be identified from data retrieved from the third party server 240, or from one of the revenue generators 110A-N. If the control period can not be identified, the service provider server 240 may determine a control period based on the advertising period. The control period may not overlap with the advertising effect period. Alternatively or in addition the service provider server 240 may identify a control region where the offline advertising campaign 125 may not have been available to the users 120A-N during the advertising period and/or the control period.

At block 340, the service provider server 240 may search historical user interaction data to extract control data, data associated with the offline advertising campaign 125 generated during the control period and from within the advertising region. The control data may include keywords searches related to the offline advertising campaign 125, the number of click throughs or impressions of online advertisements related to the offline advertising campaign 125, web traffic of other services offered by the service provider 130 related to the offline advertising campaign 125, and any other web traffic that may relate to the offline advertising campaign 125.

At block 350 the service provider server 240 may generate a report, such as a graph, showing the advertising effect data extracted at block 330 and the control data extracted at block 340. The report may enable the revenue generator A 110AN to measure the effect of their offline advertising campaign 125 on the online behavior of the users 120A-N by comparing the advertising effect data with the control data.

The service provider server 240 may calculate an effectiveness score measuring the effect of the offline advertising campaign 125 on the online behavior of the users 120A-N located within the advertising region. To calculate the effectiveness score the service provider server 240 may identify an advertising effect score and a control score. The advertising effect score may include the total number of times users 120A-N located within the advertising region searched for the keywords during the advertising period. The control score may include the total number of times the users 120A-N located within the advertising region searched for the keywords during the control period. The service provider server 240 may calculate the effectiveness score by subtracting the control score from the advertising effect score. The service provider 130 may generate a report comparing the effectiveness scores across the advertising effect period. The report may assist the revenue generator A 110A in determining when the offline advertising campaign 125 may have increased or decreased in effectiveness.

Alternatively or in addition, the service provider server 240 may calculate an effectiveness percent, representing the percent increase or decrease of web traffic during the advertising effect period. The effectiveness percent may be calculated by dividing the advertising effect score by the control score and multiplying the result by 100.

At block 360, the service provider server 240 may communicate the one or more reports and/or the effectiveness score, the effectiveness percent, the advertising effect score and the control score to the revenue generator A 110A via the networks 230, 235.

Figure 4:
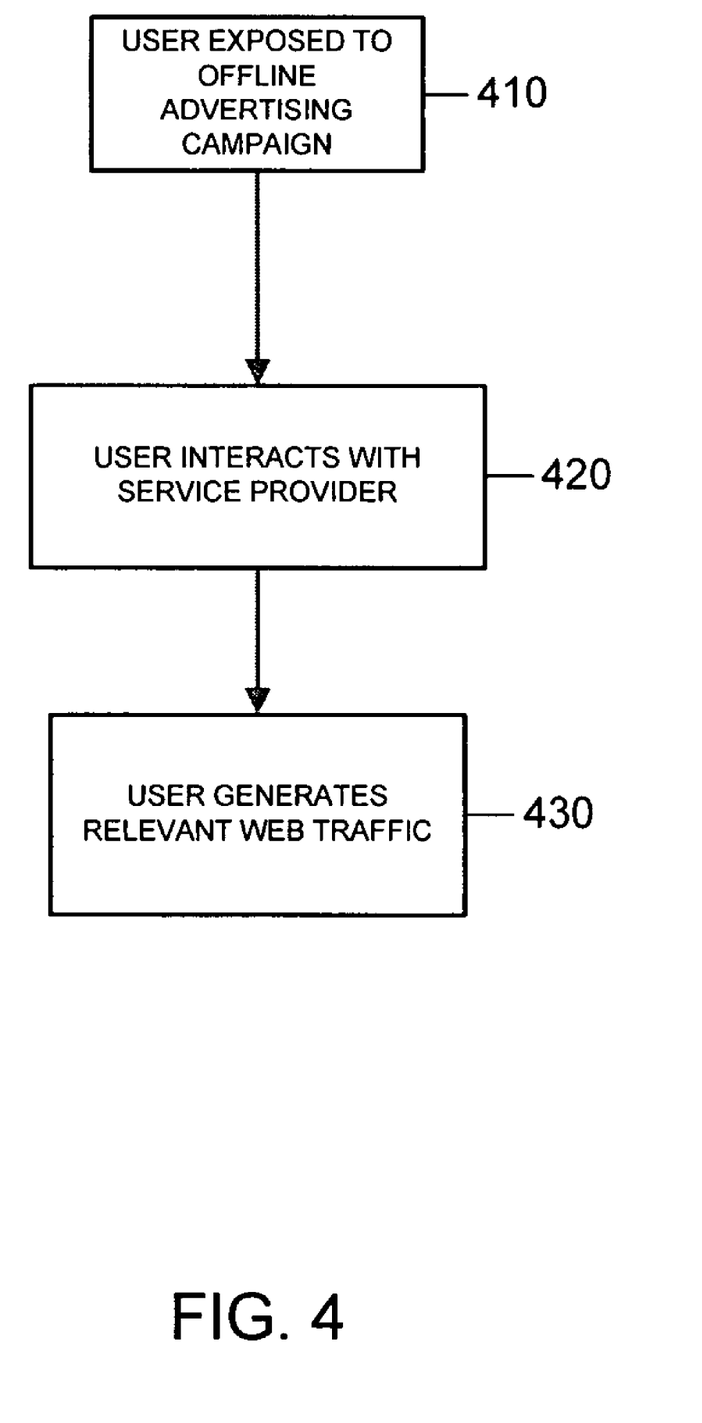
FIG. 4 is a flowchart illustrating steps that may be taken by a user in the systems of FIG. 1, and FIG. 2, or other systems for measuring the effect of an offline advertising campaign on online behavior.

FIG. 4 is a flow chart illustrating steps that may be taken by one of the users 120A-N in the systems of FIG. 1, and FIG. 2, or other systems for measuring the effect of an offline advertising campaign on online behavior. The steps may occur when one of the users 120A-N, such as the user A 120A, may be exposed to the offline advertising campaign 125. At block 410 the user A 120A may experience the offline advertising campaign 125. The offline experience may cause the user A 120A to search for online content, provided by the service provider 130, relevant to the offline advertising campaign 125. At block 420 the user A 120A may interact with the service provider 130 during the advertising effect period and from within the advertising region. At block 430 the user A 120A may generate web traffic relating to the offline advertising campaign 125 by searching for a keyword, clicking on an advertisement, or utilizing any of the services offered by the service provider 130 relevant to the offline advertising campaign 125. The service provider server 240 may store data related to the interaction with the user A 120A, including the geographic location of the user A 120A, the date/time of the interaction with the user A 120A and any other data associated with the user A 120A known to the service provider server 240.

Figure 5:
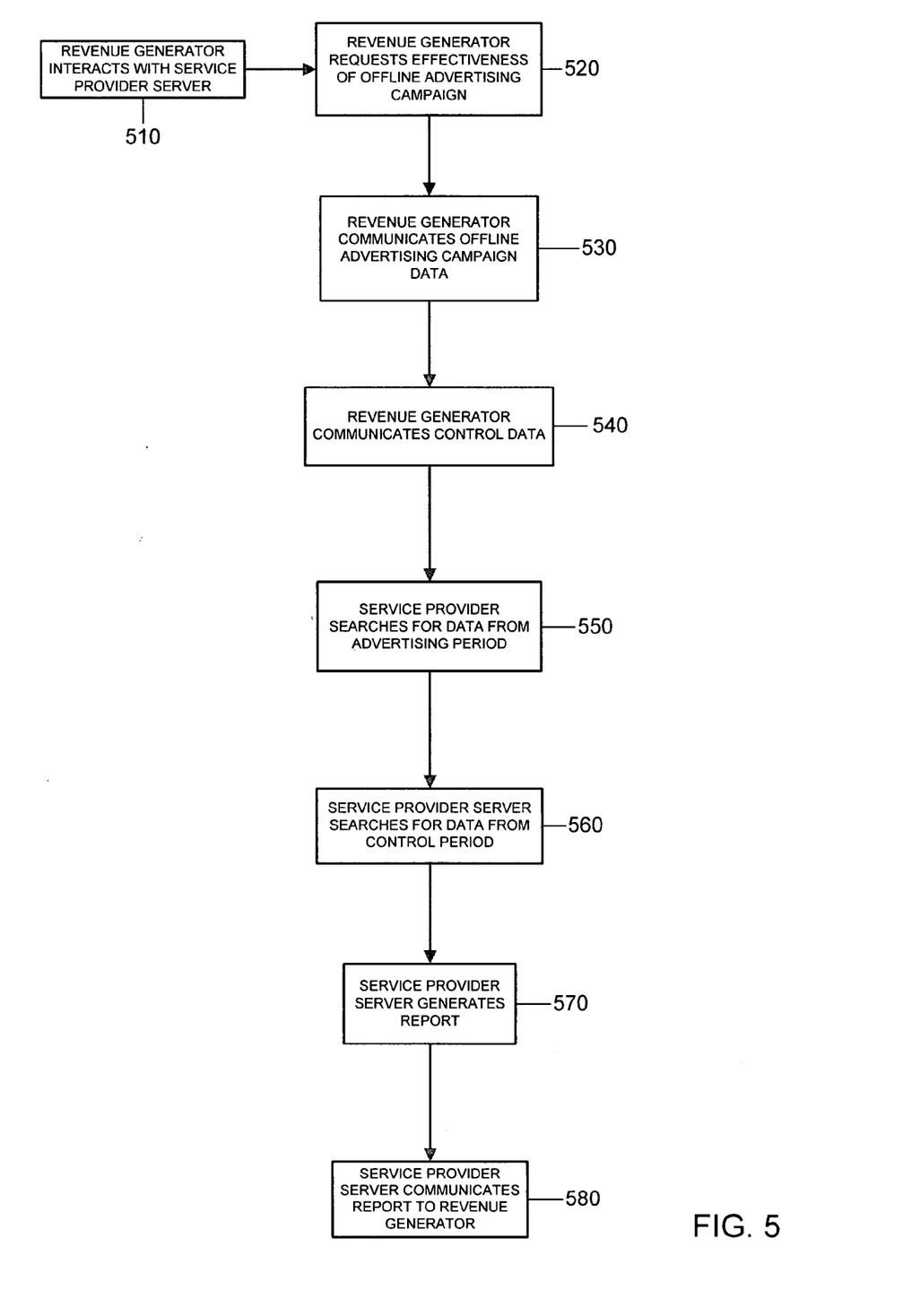
FIG. 5 is a flowchart illustrating steps that may be taken by a revenue generator in the systems of FIG. 1, and FIG. 2, or other systems for measuring the effect of an offline advertising campaign on online behavior.

FIG. 5 is a flowchart illustrating steps that may be taken by one of the revenue generators 110A-N in the systems of FIG. 1, and FIG. 2, or other systems for 100 for measuring the effect of an offline advertising campaign on online behavior. The steps may occur when one of the revenue generators 110A-N, such as the revenue generator A 110A, wishes to measure the effectiveness of an offline advertising campaign, such as the offline advertising campaign 125. At block 510 the revenue generator A 110A may interact with the service provider server 240, such as by logging onto the service provider 130. At block 520 the revenue generator A 110A may communicate a request to measure the effectiveness of the offline advertising campaign 125.

At block 530 the revenue generator A 110A may communicate information describing the offline advertising campaign 125 to the service provider server 240. The revenue generator A 110A may communicate the advertising period, the time period the offline advertising campaign 125 may have been available to the users 120A-N, and the advertising region, the region where the users 120A-N may have been capable of being exposed to the offline advertising campaign 125. The advertising region may be described by a directional address and a radius extending from the address, or may be described by city boundaries, state boundaries, national boundaries, or any other boundary defining geographic descriptor. The advertising period may include one date/time period, or a set of date/time periods. Furthermore, the revenue generator A 110A may identify an advertising effect period that may represent the period of time when the online behavior of the users 120A-N may have been affected by the offline advertising campaign 125. The advertising effect period may be longer than the advertising period, as there may be some latency between the time period when the users 120A-N may be exposed to the offline advertising campaign 125 and the time period when the online behavior of the users 120A-N may be affected.

The revenue generator A 110A may also communicate the name of the one or more products being advertised and any keywords related to the one or more products being advertised. The revenue generator A 110A may specify an online advertising listing that may refer to the one or more products advertised by the offline advertising campaign 125. The service provider server 240 may retrieve the keywords bid on by the revenue generator A 110A for the online advertisement and may use the keywords to measure the online behavior of the users 120A-N.

At block 540, the revenue generator A 110A may communicate to the service provider server 240 information describing a control period. The revenue generator A 110A may wish to view control scores or control data in order to add context to the behavior of the users 120A-N during the advertising period. The control period may be a second period of time when the offline advertising campaign 125 may not have been available to the users 120A-N located within the advertising region. Alternatively or in addition the service provider server 240 may automatically identify a control period if the revenue generator A 110A does not specify one. The service provider server 240 may identify the control period by using data provided by the third party server 250 or the revenue generator A 110A. If a control period is not supplied to the service provider server 240, the service provider server 240 may determine a control period by identifying a time period equal to, but distinct from the advertising period when the offline advertising campaign 125 may not have been available to the users 120A-N located within the advertising region.

At block 550 the service provider server 240 may search the historical user interaction data for advertising effect data, such as web traffic relating to the offline advertising campaign 125 generated during the advertising period and by users 120A-N located within the advertising region. The web traffic may include web traffic, keywords searched for by the users 120A-N that may relate to the offline advertising campaign 125, click throughs or impressions of online advertisements related to the offline advertising campaign 125, web traffic of other services offered by the service provider 130 related to the offline advertising campaign 125, and/or any other web traffic that may relate to the offline advertising campaign 125.

At block 560 the service provider server 240 searches the historical user interaction data for control data, such as web traffic data relating to the offline advertising campaign 125 generated during the control period and from within the advertising region. The web traffic may include keywords searched for that may relate to the offline advertising campaign 125, click throughs or impressions of online advertisements related to the offline advertising campaign 125, web traffic of other services offered by the service provider 130 related to the offline advertising campaign 125, and any other web traffic that may relate to the offline advertising campaign 125.

At block 570 the service provider server 240 may generate a report showing the advertising effect data extracted at block 550 and the control data extracted at block 560. The report may enable the revenue generators 110A-N to measure the effect of their offline advertising campaign 125 on the online behavior of the users 120A-N by comparing the advertising effect data with the control data.

The service provider server 240 may calculate an effectiveness score measuring the effect of the offline advertising campaign 125 on the online behavior of the users 120A-N located within the advertising region. In order to calculate the effectiveness score the service provider server 240 may identify an advertising effect score, representing the total number of times users 120A-N located within the advertising region searched for the keywords during the advertising period, and a control score, representing the total number of times the users 120A-N located within the advertising region searched for the keywords during the control period. The service provider server 240 may then calculate the effectiveness score by subtracting the control score from the advertising effect score. The service provider 130 may generate a report comparing the effectiveness scores across the advertising effect period. The report may assist the revenue generator A 110A in determining when the offline advertising campaign 125 may have increased or decreased in effectiveness.

Alternatively or in addition, the service provider server 240 may calculate an effectiveness percent, representing the percent increase or decrease of web traffic during the advertising effect period. The effectiveness percent may be calculated by dividing the advertising effect score by the control score and multiplying the result by 100.

At block 570, the service provider server 240 may communicate the one or more reports and/or the effectiveness score, the effectiveness percent, the advertising effect score and the control score to the revenue generator A 110A via the networks 230, 235.

Figure 6:
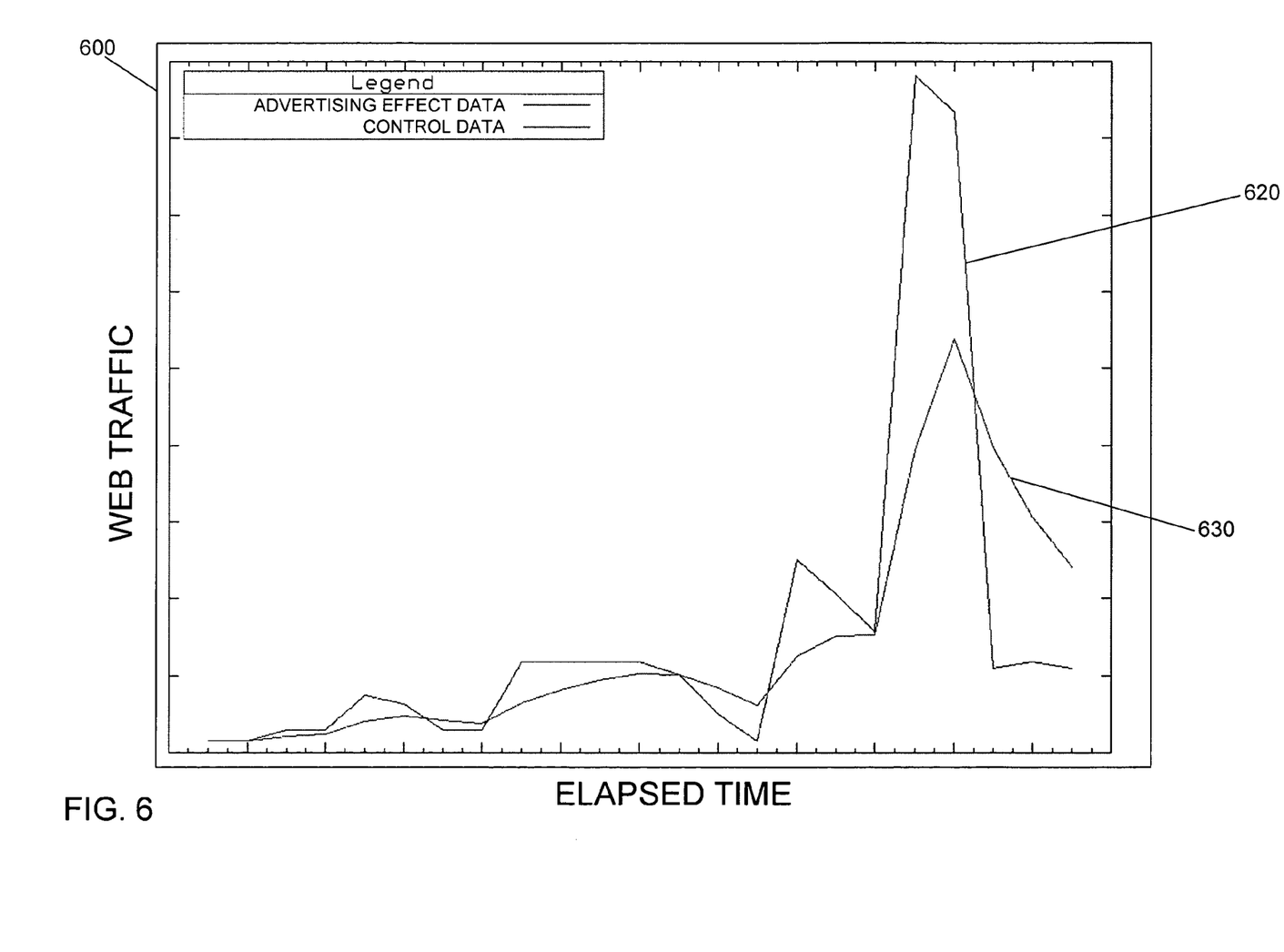
FIG. 6 is a screenshot of a web traffic graph containing data representing the web traffic related to an offline advertising campaign generated within the advertising region over both the control period and the advertising effect period that may be displayed to a revenue generator.

FIG. 6 is screenshot of a graph 600 displaying the web traffic related to an offline advertising campaign generated within the advertising region over both the control period and the advertising effect period. The x-axis of the graph may represent the time elapsed from the beginning of the respective time periods and the y-axis of the graph may represent the web traffic related to the offline advertising campaign 125 generated within the advertising region, such as the total number of searches by the users 120A-N related to the offline advertising campaign 125.

The graph 600 may be displayed to one of the revenue generators 110A-N when the revenue generator A 110A submits information describing an offline advertising campaign 125, including an advertising region and an advertising effect period and information describing a control period. Alternatively or in addition the service provider server 240 may automatically select a control period, which may be a time period of equal length to the advertising effect period, but distinct from the advertising effect period, when the offline advertising campaign 125 may not have been available to the users 120A-N within the advertising region. The graph 600 may include an advertising effect data line 620 and a control data line 630.

The advertising effect data line 620 may represent the total number of keywords searched for by users 120A-N located within the advertising region during the advertising effect period. The control data line 630 may represent the total number of keywords searched for by users 120A-N located within the advertising region during the control period.

A revenue generator A 110A may compare the advertising effect data line 620 and the control data line 630 to measure the effect of their offline advertising campaign 125 on the online behavior of the users 120A-N located within the advertising region. The differences between the advertising effect data line 620 and the control data line 630 may represent the effect of the offline advertising campaign 125 on the users 120A-N located within the advertising region.

The periods of time when the web traffic of the advertising effect data line 620 exceeds the control data line 630 may represent period of time when the users 120A-N may have been positively effected by the offline advertising campaign 125 of the revenue generator A 110A. The greater the amount of web traffic of the advertising effect data line 620 exceeds the amount of web traffic of the control data line 630, the greater the positive effect the offline advertising campaign 125 had on the online behavior of the users 120A-N.

The periods of time when the web traffic of the control data line 630 exceeds the advertising effect data line 620 may represent when the users 120A-N may not have been effected by the offline advertising campaign 125 of the revenue generator A 110A, or may represent when the users 120A-N may have been adversely effected by the offline advertising campaign 125 of the revenue generator A 110A. The greater the amount of web traffic of the control data line 630 exceeds the amount of web traffic of the advertising effect data line 620, the greater the adverse effect the offline advertising campaign 125 may have had on the online behavior of the users 120A-N.

FIG. 7 illustrates a general computer system 700, which may represent a service provider server 240, a third party server 250, an advertising services server 260 or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server 240, a third party server 250, an advertising services server 260, the servers may communicate with users 120A-N and the revenue generators 110A-N through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for determining the effect of an offline advertising campaign on an online behavior of a set of users, comprising:
receiving, by a processor, a description of an offline advertising campaign of an advertiser;
processing, by the processor, the description to generate at least one keyword related to the offline advertising campaign;
determining, by the processor, an advertising effect period when the offline advertising campaign is capable of affecting an online behavior of the set of users, wherein the advertising effect period comprises an advertising period when the offline advertising campaign was available to the set of users and a time interval extending beyond the advertising period;
determining, by the processor, an advertising effect data representing the online behavior of the set of users related to the at least one keyword offline advertising campaign, during the advertising effect period;
identifying, by the processor, a control data representing a control online behavior related to the generated at least one keyword submitted by users not exposed to the offline advertising campaign; and
determining, by the processor, the effect of the offline advertising campaign on the control online behavior of the set of users by comparing the advertising effect data with the control data comprising:
generating an advertising effect score wherein the advertising effect score is based on a number of records in the advertising effect data:
generating a control score wherein the control score is based on a number of records in the control data; and
calculating an effectiveness score wherein the effectiveness score is calculated by subtracting the control score from the advertising effect score.

2. The computer-implemented method of claim 1 wherein the control online behavior comprises a second online behavior of the set of users related to the at least one keyword during a second time period when the offline advertising campaign was not capable of affecting the online behavior of the set of users.

3. The computer-implemented method of claim 1 wherein processing the description to generate at least one keyword related to the offline advertising campaign further comprises generating at least one keyword related to the offline advertising campaign, the keyword selected from keywords on which the advertiser has bid.

4. The computer-implemented method of claim 1 wherein the online behavior of the set of users comprises a plurality of searches for the at least one keyword.

5. The computer-implemented method of claim 1 wherein processing, by the processor, the description to generate at least one keyword related to the offline advertising campaign further comprises processing, by the processor, the description to generate at least one keyword related to the offline advertising campaign by content matching the description and content of an online advertisement of the advertiser.

6. The computer-implemented method of claim 1 further comprising calculating, by the processor, an effectiveness percent wherein the effectiveness percent is calculated by dividing the advertising effect score by the control score and multiplying the result by 100.

7. The computer-implemented method of claim 1 wherein the offline advertising campaign comprises an advertisement displayed on a television.

8. A computer-implemented method of measuring web traffic relating to an offline advertising campaign, comprising:
receiving, at a processor, a description of an offline advertising campaign of an advertiser;
processing, by the processor, the description to generate at least one keyword associated with the offline advertising campaign comprising content matching the description and content of an online advertisement of the advertiser;
identifying, by the processor, a time period corresponding to when the offline advertising campaign was available to a set of users; and
measuring, by the processor, a web traffic resultant from the set of users submitting the generated at least one keyword during the time period.

9. The computer-implemented method of claim 8 wherein the set of users are located within a geographic region.

10. The computer-implemented method of claim 8 wherein the web traffic comprises a plurality of searches for the at least one keyword a set of searches performed by the set of users, relating to the offline advertising campaign.

11. The computer-implemented method of claim 8 wherein the time period comprises an advertising period when the offline advertising campaign was available to the set of users and a time interval extending beyond the advertising period.

12. The computer-implemented method of claim 11 wherein the time interval is based on a type of advertisement of the offline advertising campaign.

13. The computer-implemented method of claim 12 wherein the type of advertisement comprises at least one of a television advertisement, a radio advertisement and a print advertisement.

14. The computer-implemented method of claim 8 wherein receiving the description of the offline advertising campaign of the advertiser further comprises receiving the description of the offline advertising campaign of the advertiser from a server of a third party, the web traffic comprises a set of requests from the set of users.

15. The computer-implemented method of claim 8 wherein the web traffic comprises a set of requests from the set of users and the web traffic is measured by a number of requests in the set of requests.

16. A system for measuring web traffic relating to an offline advertising campaign of an advertiser, comprising:
   a memory to store a description of an offline advertising campaign of an advertiser, a time period, a set of users, and a web traffic data; and
   a processor operatively connected to the memory and configured to:
      receive the description of the offline advertising campaign of the advertiser;
      determine, based on the description, at least one keyword related to the offline advertising campaign comprising content matching the description and content of an online advertisement of the advertiser;
      identify the time period when the offline advertising campaign was available to the set of users; and
      measure the web traffic data resultant from the set of users submitting the generated at least one keyword during the time period.

17. The system of claim 16 wherein the web traffic comprises a set of requests generated by the set of users and the web traffic is measured by a number of requests in the set of requests.

18. The system of claim 17 further comprising an interface operatively connected to the memory and the processor to communicate with the advertiser, the interface operative to communicate the number of requests in the set of requests to the advertiser.

19. The system of claim 16 wherein the processor further determines the at least one keyword related to the description by content matching the description and an online advertisement of the advertiser.

20. A computer-implemented method for determining a time of day which is most effective for providing an offline advertising campaign to a set of users, comprising:
   at a processor, receiving a first description of a first offline advertising campaign of an advertiser comprising a plurality of advertisements provided to a set of users during a first time of day, the first offline advertising campaign being capable of affecting a first online behavior of a set of users during a first time interval;
   processing, by the processor, the first description to generate at least one first keyword related to the first offline advertising campaign of the advertiser comprising content matching the first description and content of an online advertisement of the first advertising campaign;
   determining, by the processor, a first advertising effectiveness representing the first online behavior of the set of users related to the at least one first keyword during the first time interval, wherein the first online behavior of the set of users comprises a first plurality of web searches for the at least one keyword;
   receiving a second description, at the processor, of a second offline advertising campaign of the advertiser comprising the plurality of advertisements provided to the set of users during a second time of day, the second offline advertising campaign being capable of affecting a second online behavior of the set of users during a second time interval, wherein the second time of day is different than the first time of day;
   determining, by the processor, a second advertising effectiveness representing the second online behavior of the set of users related to the at least one first keyword during the second time interval, wherein the second online behavior of the set of users comprises a second plurality of web searches for the at least one keyword; and
   comparing, by the processor, the first advertising effectiveness and the second advertising effectiveness to determine whether the first time of day or the second time of day had a greater advertising effectiveness on the set of users.

* * * * *